United States Patent
Scanlon

(10) Patent No.: US 11,158,320 B2
(45) Date of Patent: Oct. 26, 2021

(54) METHODS AND SYSTEMS FOR SPEECH DETECTION

(71) Applicant: SoapBox Labs Ltd., Dublin (IE)

(72) Inventor: Patricia Scanlon, Dublin (IE)

(73) Assignee: Soapbox Labs Ltd., Dublin (IE)

( * ) Notice: Subject to any disclaimer, the term of this patent is extended or adjusted under 35 U.S.C. 154(b) by 0 days.

(21) Appl. No.: 16/852,376

(22) Filed: Apr. 17, 2020

(65) Prior Publication Data

US 2020/0286484 A1  Sep. 10, 2020

Related U.S. Application Data

(63) Continuation of application No. PCT/EP2018/078469, filed on Oct. 18, 2018.

(30) Foreign Application Priority Data

Oct. 18, 2017  (EP) .................................... 17197186

(51) Int. Cl.

| | |
|---|---|
| *G10L 15/24* | (2013.01) |
| *G06K 9/00* | (2006.01) |
| *G06F 3/16* | (2006.01) |
| *G06F 21/32* | (2013.01) |
| *G06F 3/01* | (2006.01) |
| *G10L 15/22* | (2006.01) |

(52) U.S. Cl.
CPC .............. *G10L 15/24* (2013.01); *G06F 3/012* (2013.01); *G06F 3/167* (2013.01); *G06F 21/32* (2013.01); *G06K 9/00228* (2013.01); *G10L 15/22* (2013.01)

(58) Field of Classification Search
CPC .......... G06F 3/167; G06F 21/32; G06F 3/013; G06F 3/012; G10L 15/22
See application file for complete search history.

(56) References Cited

U.S. PATENT DOCUMENTS

| | | | | |
|---|---|---|---|---|
| 2003/0018475 | A1* | 1/2003 | Basu | ........................ G10L 15/25 |
| 2003/0171932 | A1* | 9/2003 | Juang | ...................... G10L 15/24 |
| | | | | 704/276 |
| 2011/0257971 | A1* | 10/2011 | Morrison | ................ G10L 25/78 |
| | | | | 704/233 |
| 2013/0021459 | A1* | 1/2013 | Vasilieff | ................. H04N 7/183 |
| | | | | 348/77 |

(Continued)

FOREIGN PATENT DOCUMENTS

| | | |
|---|---|---|
| EP | 2631843 A2 | 8/2013 |
| EP | 2631843 A3 | 8/2013 |

OTHER PUBLICATIONS

PCT International Search Report and Written Opinion for International Application No. PCT/USEP2018/078469 dated Feb. 13, 2019, 13 pages.

*Primary Examiner* — Samuel G Neway
(74) *Attorney, Agent, or Firm* — Lowenstein Sandler LLP

(57) ABSTRACT

Methods and systems for processing user input to a computing system are disclosed. The computing system has access to an audio input and a visual input such as a camera. Face detection is performed on an image from the visual input, and if a face is detected this triggers the recording of audio and making the audio available to a speech processing function. Further verification steps can be combined with the face detection step for a multi-factor verification of user intent to interact with the system.

16 Claims, 7 Drawing Sheets

(56) References Cited

U.S. PATENT DOCUMENTS

| | | | | |
|---|---|---|---|---|
| 2013/0227678 A1* | 8/2013 | Kang | G06K 9/00335 |
| | | | 726/19 |
| 2013/0304479 A1* | 11/2013 | Teller | G06F 3/0481 |
| | | | 704/275 |
| 2014/0010418 A1* | 1/2014 | Dey | G06K 9/00281 |
| | | | 382/118 |
| 2015/0066494 A1* | 3/2015 | Salvador | G10L 21/0202 |
| | | | 704/224 |
| 2015/0177904 A1* | 6/2015 | Makuch | G06F 3/017 |
| | | | 345/178 |
| 2015/0331490 A1* | 11/2015 | Yamada | G10L 25/78 |
| | | | 345/156 |
| 2015/0339047 A1* | 11/2015 | Lee | G06F 3/0485 |
| | | | 715/765 |
| 2015/0340029 A1* | 11/2015 | Kunieda | G10L 15/08 |
| | | | 704/249 |
| 2016/0189733 A1* | 6/2016 | Vasilieff | G10L 25/78 |
| | | | 348/77 |
| 2017/0140223 A1* | 5/2017 | Wilson | G06K 9/00604 |
| 2017/0277257 A1* | 9/2017 | Ota | G06F 1/163 |
| 2020/0286484 A1* | 9/2020 | Scanlon | G06K 9/00228 |

\* cited by examiner

METHODS AND SYSTEMS FOR SPEECH DETECTION

RELATED APPLICATIONS

This application is a continuation application of co-pending International Patent Application No. PCT/EP2018/078469, filed Oct. 18, 2018, which claims the benefit of priority from EP Patent Application No. 17197186.4 filed Oct. 18, 2017, which is herein incorporated by reference.

TECHNICAL FIELD

This invention relates to the field of speech processing, and in particular to speech detection.

BACKGROUND ART

Interactions that require a user to talk include requiring a user to read text, or to identify/talk about an image or in response to a visual prompt, to copy an audio prompt, to translate audio/text, to answer a question, or to engage in a 'conversation'. Other interactions and applications include voice search, interaction with navigation systems, game control, dictation, voice instructions, or general voice input functionality of any system.

For any such speech recognition system, there is a challenge in knowing when a user is trying to use the system.

One solution is to implement an "always listening" functionality. The system continuously "listens" (i.e. processes audio input) for a 'wake word' like 'Alexa' or 'OK Google'. This is controversial as users may believe that the system could be processing, transferring or transcribing all the audio it picks up.

In recent years there have in fact been several instances where devices such as television sets (smart TVs) have been found to be doing just this, collecting user speech data which is transferred back to the manufacturer or given to third parties. References to "Big Brother" are apt, The unauthorised collection of speech data is a major concern for consumers and can damage their trust in devices. Concerns relate to privacy and to data protection. Where the speech data includes children's speech, the concerns are increased. Lawsuits have been filed against toymakers arising from the unlimited collection of speech data from children, for whom parental consent has not been obtained.

Apart from those concerns, the "always listening" approach, with or without a predefined wake word, is highly inefficient. It involves collecting and processing useless audio, which is expensive for the system, occupying processors and running down the battery.

More efficient approaches involve a prompt to a user at the time that audio processing is activated, or user indication of intention to interact.

The prompt approach will typically use a display (for example the appearance of an icon, a text prompt, or the highlighting of the screen or an area of the screen, to visually to indicate to the user when to begin speaking. This approach often fails as it does not take into account any user intent or readiness.

The user indication of intention to interact is typically implemented via a button press (physical or soft button). The button can be "press to talk" where the system listens and processes data for as long as the button is held down, or "tap to talk" where the user taps once to start and taps again to stop the system listening. Whichever of these approaches is adopted, there are disadvantages. For children, button presses can be difficult to comply with, and frequently fail because the child is unable to properly coordinate the actions (press the button, wait a short period for the system to be ready, then start to speak).

DISCLOSURE OF THE INVENTION

There is provided in one aspect, a method of processing user input to a computing system having an audio input and a visual input, comprising the steps of:
- providing a visual or auditory prompt to a user of the computing system;
- performing a face detection method on an image received from the visual input after the visual or auditory prompt has been provided; and
- responsive to a determination that said face detection method has detected a face within a predetermined time of the visual or auditory prompt having been provided:
  - recording an audio signal from said audio input; and
  - making said audio signal available to a speech processing function.

By employing face detection as a necessary precondition and trigger for the recording and processing of audio signals, the issue of user intention is addressed to a large degree. If the system does not detect a user's face, it will not record an audio signal and make it available for speech processing. This provides significant advantages to the user, in that it prevents casual audio being recorded when a face is not detected. When implemented in a handheld device such as a mobile phone, face detection provides a strong indicator of user intention to interact.

By combining face detection with the provision of a prompt to the user, the intentionality is greatly strengthened. Furthermore, the particular combination of a user prompt combined with face detection solves a particular problem where the user is a small child, or has compromised dexterity or is unable to manually interact with a system. Unlike systems that are always on—processing video data to detect a face continually, with consequent impact on power usage and background processing requirements—the current system only needs to perform face detection for a predetermined period of time following the prompt. Similarly, there is an economy of processing and power as compared to systems relying on a "wake word" ("OK Google" or "Hey Alexa" being current examples). Finally, unlike systems that are only active when the user presses a button ("tap to speak") to trigger either speech processing or face detection, the user is not required to have dexterity, physical proximity, or (particularly in the case of young children) the understanding and control required to sequence and time the button press to the speech input. The visual input is preferably a camera, which can be local to the device which is recording (and optionally processing) the audio, or it can be located remotely from the recording device. Image processing may be performed on still images or on video images, streams or files, and terms such as "image" or "image processing" are intended to encompass both still and moving images. The face detection can be achieved not only by processing conventional camera images, but also by infrared detectors, by thermal imaging, by laser interrogation, or in any other suitable manner.

The method can be implemented in a distributed fashion, with different elements of the system, responsible for different functionality, provided in different devices. A common implementation is to have face detection and audio capture local to a single user device, with audio being streamed to a remote system for recording and processing.

The predetermined time within which the determination of the detection of a face should be made, following the visual or auditory prompt having been provided, may be implemented as an absolute value (e.g. within x number of seconds of the start or end of the prompt), or dynamically according to the complexity of the prompt, the ability of the user, or learned behaviour. It can be tied to the operation of software providing the prompt (e.g. while a visual prompt is displayed on screen) or to the operation of some other aspect of the device (e.g. while an app is active or in focus, or until a screen timeout occurs or the user locks the device). The skilled person will readily find other examples. The important aspect is that the face detection is limited to and associated with the prompt so that it provides a good signal of intentionality to interact with the device or system.

Preferably, the method involves performing one or more additional verification steps, wherein the steps of recording an audio signal and making said audio signal available are dependent on the outcome of said one or more further verification steps in addition to said face detection method detecting a face.

In this way a multi-factorial determination can be made, not relying on face detection alone. The particular choice of which additional verification steps will often be determined by the application. For example, a user of a language learning system who is expected to say what is onscreen or to read (or translate) a visual prompt, would be strongly expected to be looking at the screen. On the other hand, a user of a car's navigation system or some other voice interface would not be expected to be looking at the screen to the same extent.

It can be hard to know what context the user means when they speak. This can be particularly the case where there might be multiple items in the field of view of the user that could react to a voice interaction. For example, the user might be presented with multiple items on a screen and want to action just one of them. There might be several devices (home devices, smart devices, smart toys or robots) available for interaction. In the case of virtual reality, mixed reality or augmented reality there could be multiple items in the VR/MR/AR overlay seen by a user as well as in the real world environment of the user. Eye tracking, using a camera on the device or on eyewear worn by the user, to determine where/what the user is looking at. When the user gives a voice command the event is triggered for that item or area in the user's focus.

Accordingly in suitable circumstances, the one or more additional verification steps may comprise a gaze direction detection step to verify that the user is looking in a predefined direction or range of directions.

Additionally or alternatively, the one or more additional verification steps may comprise a mouth movement detection step to verify that the user's mouth is moving.

Optionally, the mouth movement detection step further verifies that the mouth movement of the user corresponds to a movement pattern typical of speech.

Optionally, the one or more additional verification steps comprise an audio detection step to verify that the audio input is receiving sound from the environment of the user.

Such audio detection or processing may involve temporary buffering or recording of the audio input, which is to be distinguished from the subsequent recording of a signal in response to a successful determination of user intent, for use in subsequent processing. A loose analogy can be made with the distinction between how a processor may temporarily store in memory the variables and data required for a current operation and the writing of data and variables to disk storage.

Optionally, the audio detection step further verifies that the characteristics of detected sound are consistent with speech.

This may be as simple or as sophisticated as the designer of the system wishes. Relatively basic filters can be used to distinguish between sound that is of similar frequency range to speech and sound that is non-speech noise, for example, or a more sophisticated audio processing system can be used to more reliably ensure that the detected sound is very likely to be speech.

Optionally, the audio detection step further verifies that the direction from which sound is detected is consistent with the direction of the detected face.

Thus if the audio input is a microphone (or plurality of microphones) with directional capabilities, the sound may be associated (or not) with the visual field in which a face was detected.

In another optional implementation, the audio detection step further verifies that the characteristics of detected sound are consistent with a speech profile associated stored for a given user.

Thus, the system may be configured to record and make available for processing only the audio signals that are consistent with a biometric profile, audio fingerprint, or other audio characteristics specifically stored in relation to a profile of a user who is registered with the system in question. Similarly, the face detection algorithm may only provide an indication of success (and thus a trigger to record and make available the audio signal) if the face detected is recognised as being a user registered with the system.

In certain preferred embodiments, at least two of said additional verification steps are performed.

The precise combination of verifications that are chosen for a given application, or for a given set of circumstances or environmental factors, is at the discretion of the system designer, and may be dependent on factors such as the confidence with which one determination was made, the availability of a network connection, battery levels, system settings, the obligations imposed by data protection legislation, light levels, background noise levels, or any other factors.

In certain embodiments, the determination of the face detection and/or the additional verification steps can be a weighted determination indicative of the reliability of the determination in question, and wherein a positive determination is made when the weighted determination is above a threshold.

Thus, a combination of verifications can be determined to meet a threshold based on a weighted sum or other combination of determination results. In this way a multi-factorial determination of user intention can be made even where one verification (e.g. face detection, gaze tracking, audio input characteristics) is weaker than would normally be expected.

Usefully, the face detection step may verify that the detected face is oriented in a predetermined direction or range of directions.

In other words, it may not be regarded as sufficient simply to determine that a face was detected. It may also be regarded as a requirement in a given application that the face is oriented towards the screen or towards some other interface, or even towards a particular part of a room or vehicle.

Suitably, the face detection step may verify that the visual input is at or below the level of the user's eyes or nose.

This is particularly useful in mobile device and handheld systems, where in normal use the user may hold the device somewhere below the face, so that e.g. a device-mounted camera detects nostrils. The detection of nostrils may both provide a useful reference point for a face detection algorithm, and also a strong indicator that the detected face is that of a user intending to interact with the device.

The method may include the step of performing said speech processing function on the recorded signal.

Alternatively or additionally, the method may include the step of sending said recorded audio signal to a remote computing device for speech processing.

Optionally, the method further includes the step of buffering said audio signal, and (i) if a determination is made not to record and make available the audio signal for speech processing, overwriting or discarding the buffered signal; and (ii) if a determination is made to record and make available the audio signal for speech processing, retrieving said signal from the buffer.

Preferably, said buffer is of sufficient capacity to store an audio signal of a duration at least as long as the time required to determine the face detection and optionally the additional verification steps.

This is useful in avoiding "chopping" the start of the speech which the user intended the device to capture, while it makes its verification.

Buffering in this way is to be distinguished from subsequently recording and making available the audio signal in response to a positive determination.

More preferably, the buffer size is tailored to the required time (e.g. is chosen to fit 100% to 200% of the time period required on average for a successful verification to be established).

In another aspect there is provided a computerised system for processing user input, comprising:
- an audio input;
- a visual input;
- an interface to a storage medium suitable for recording audio data;
- an interface to a speech processing function;
- an interface to an output, via which a visual or auditory prompt may be provided to a user of the computing system; and
- a processor programmed with instructions effective to cause said system to:
  - control the output to provide a visual or prompt to a user of the computing system;
  - perform a face detection method on an image received from the visual input after the visual or auditory prompt has been provided; and
  - responsive to a determination that said face detection method has detected a face within a predetermined time of the visual or auditory prompt having been provided:
    - record an audio signal from said audio input; and
    - make said audio signal available to a speech processing function.

It will be appreciated that the computerised system, in preferred embodiments, may be programmed to implement the method of the preferred features described above and in the dependent claims.

BRIEF DESCRIPTION OF THE DRAWINGS

The invention will now be further illustrated by the following description of embodiments thereof, given by way of example only with reference to the accompanying drawings, in which:

In FIG. 1 there is indicated at 10 a computerised system for processing user input. The system is implemented in a typical mobile handset or smartphone but which has bespoke functionality programmed within an app or program 12 which can be executed on the device.

Figure 1:
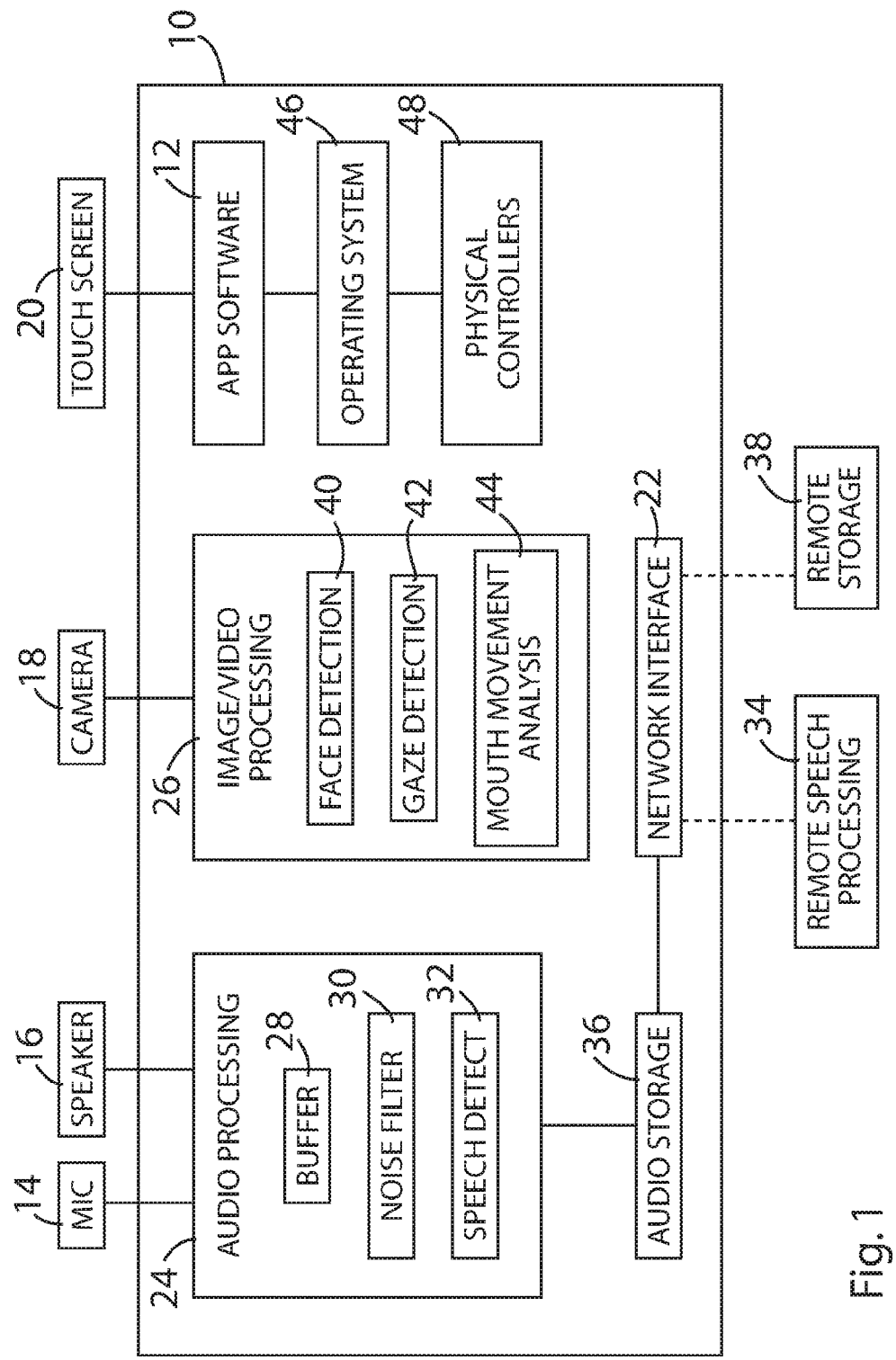
FIG. 1 is a block architecture diagram of a computerised system for processing user input.

It will be understood that as with conventional devices, the system 10 has a processor, a memory, and permanent storage, which are not shown but upon which the functional components shown in FIG. 1 operate in known manner under the overall control of an operating system 46 which interacts with the hardware via a plurality of physical controllers 48.

The device has a number of user input and output interfaces, typically including at least a microphone 14, speaker 16, camera 18 and a touchscreen 20, and also has a network interface 22 via which the device communicates wirelessly with remote networks, devices and systems. It will be appreciated that the interfaces are simplified, and modern devices may have many additional sensors, input and output devices, as well as having a plurality of microphone, cameras, network interfaces of different kinds, etc. The details of such implementation will of course be utilised in any particular implementation but do not affect the underlying basic operation of the invention as described herein.

For the evaluation of user inputs according to the invention, FIG. 1 highlights two broad categories of signal processing, namely audio processing functions 24 and image or video processing 26. The designer of a system may choose to use dedicated processors for some or all of the functionality of audio and image/video processing or the processing may be done on a general processor of the device.

The audio input signal from the microphone is directed to audio processing where it may be buffered if required in a circular buffer 28. Additional functionality provided in the audio processing may include a noise filter 30 to exclude or differentiate from non-speech or background noise and a speech detection function 32 which may detect whether a given sound is or is not human speech. The speech detection function can be as sophisticated as the hardware allows, depending on the preferences of the system designer and the needs of the software. For example, while FIG. 1 shows that the primary speech processing 34 occurs remotely, to allow for more powerful speech detection, transcription, speech verification, training of speech models, matching against biometric patterns, etc., any or all of this functionality could be performed locally on the device.

Audio storage 36 may be provided locally on the device, in which audio data can be stored either on a temporary basis until uploaded to a remote storage system 38 for longer term storage, or in which the data can be stored locally on a long term basis. It will be appreciated that the choice of local/remote processing and storage will be driven by the needs of the particular application, the capabilities of the systems involved, and commercial factors.

The image/video processing subsystem 26 has a plurality of functional modules for processing and performing particular operations on images received from a visual input device such as camera 18. In particular in the context of this disclosure a face detection function 40 is provided.

This face detection function can process an image or image stream to make a determination whether it contains a face. It may perform additional checks such as matching the face against a user profile database, checking that the face is detected at a particular size in the image (and hence distance from the camera) or at a particular angle with respect to the camera (such as that it is facing the camera, or that the camera position relative to the face is consistent with an expected position in which a user would hold the device if wishing to interact with it. The face detection function can output a binary decision (face detected or not detected) or a more informative determination can be made, including providing a multi-factorial determination (face detected, user matched, user not facing camera, camera held in position for interaction), or a weighted score indicating the calculated likelihood of a valid match (i.e. that a face has been detected for a user likely to wish to interact according to data gleaned from the image).

Also shown in the image processing subsystem 26 are an optional gaze detection module 42 and a mouth movement analysis module 44. The gaze detection module 42 operates in known manner to determine a gaze direction relative to the camera, which can be sufficiently precise to determine that a user is looking at the device screen or some other display, or even that the user is looking at a certain part of the screen or display (e.g. the user is looking at the prompt to speak). The mouth movement analysis module 44 can be provided as part of the face detection function, or may receive inputs from the face detection module. The mouth movement analysis module identifies if the mouth of a user is moving, and optionally, if the mouth is moving in a pattern that is consistent with speaking. It may even identify if the movements are consistent with speech expected from a prompt given to the user or from other contextual information in the app (in other words, perform a form of lip reading from which user intent can be ascertained).

As will be now described in relation to FIGS. 2-7, the system of FIG. 1 enables an indication of user intent to interact with the system to be determined and this determination to be used as the basis for a decision to record and process speech or not.

FIGS. 2-7 describe several different implementations with different degrees of functionality but having certain core steps in common. Accordingly, where the same reference numerals are used in different figures, the reference is to the same function and it need not be described again in the interests of avoiding undue repetition.

Figure 2:
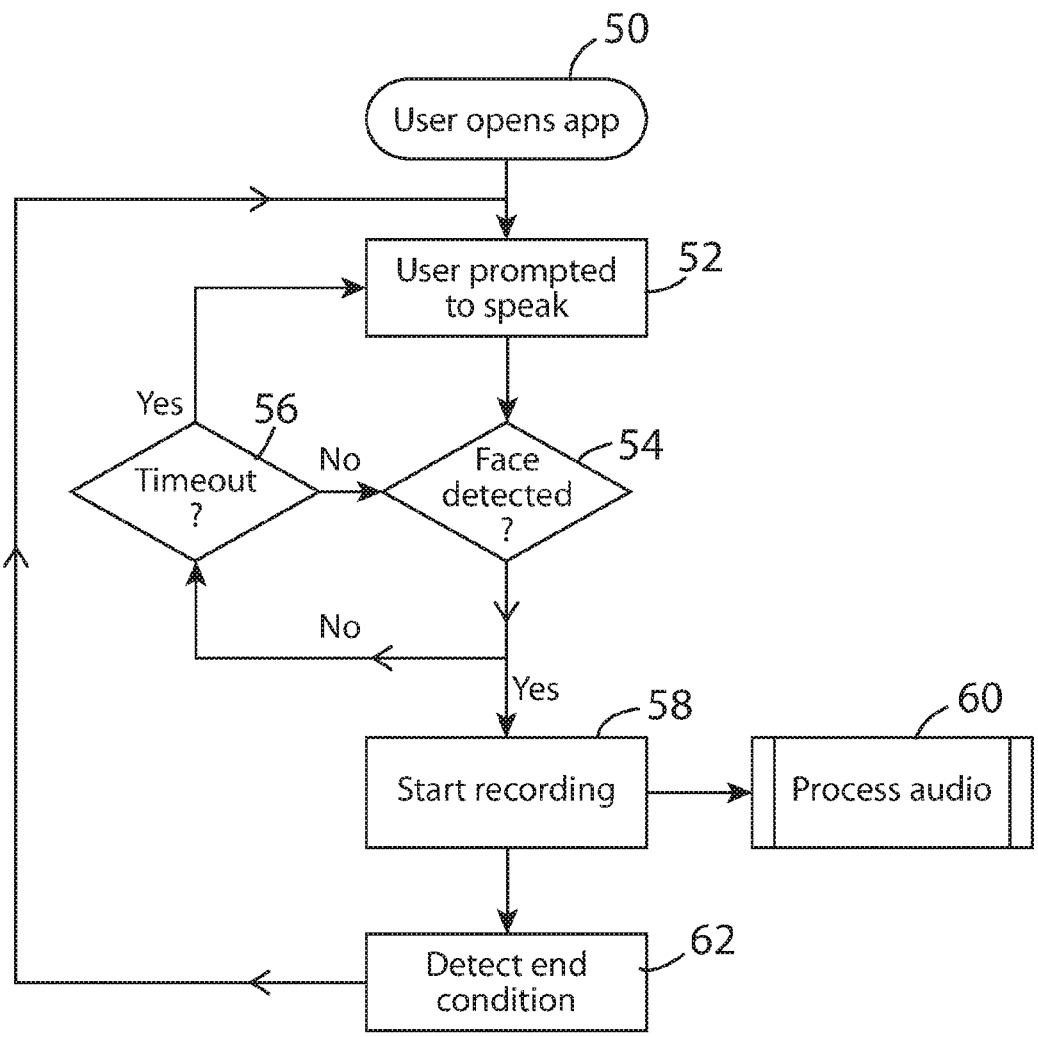
FIG. 2 is a flowchart of a first method of processing user input.

In FIG. 2, there is shown a method that operates on the system of FIG. 1, although it could equally be implemented in any other computing system having access to an audio input, a visual input and a processor suitably programmed to carry out the functionality now described. The method may be built into a larger app or program having voice interaction, or it can be provided as a standalone app, program, or system function.

In the description that follows it is assumed purely for putting the invention in context that the method is provided as a built-in function within a voice-interactive app such as an app to assist children learning to read. Such an app may for example display words or sounds on screen and wait for a child to read the words before continuing to a new screen.

The user opens the app, step 50 and begins interacting with it in known manner. When the user is prompted to speak, step 52, the audio input is not immediately recorded and processed upon display of the prompt, and nor is the user required to tap or hold a button to indicate an intention to speak to the app. Instead the face detection module processes images from the camera to determine if a face is detected, step 54, and possibly if the detection meets certain criteria (user identified, face sufficiently close, angle of face correct, etc.). If no satisfactory face detection is determined, the process of looking for a face continues until a timeout is reached, step 56, causing the user to again be prompted (or the app could be programmed to move on, pause, prompt the user "are you still there?", or save progress and close). The timeout can be linked to the prompt, e.g. if a visual prompt is displayed on a screen, then the face detection may remain active while the screen shows the prompt, or for a number of seconds after the prompt is removed from the screen, or until a screen timeout occurs, or for any other suitable time period.

If a face is detected meeting any criteria that may have been set, this positive determination in step 54 causes the system to start recording audio, step 58. The audio can be simultaneously sent for local processing, step 60, for example by performing onboard speech recognition, or it can be made available for processing by another program, device or system, such as by sending it via the network interface to a remote server which can process the speech and optionally return results according to the outcome of the processing.

If an end condition is detected, step 62, the process reverts to step 52 and the next prompt to speak. The end condition may be any condition that has been programmed as an indication that recording should stop. For example it could be the detection of silence indicating the user has stopped speaking, or it may be a timeout (either a global default timeout or a timeout that is dependent on the expected duration of speech according to the prompt, or it may arise from the user saying "stop" or similar commands, or from the speech processing engine (local or remote) returning a result (for example indicating that the prompt has been responded to correctly or not, when the speech is processed in near-real time) or the user making an intervention on the touchscreen, or a user gesture picked up by the camera, and so on.

It will be appreciated that using the method of FIG. 2, the decision to record audio and to make the audio available for processing (including optionally the decision to start processing the audio) is arrived at more intelligently and with a higher likelihood of being in accordance with the user's intention. It furthermore is less prone to errors arising from user inability to interact with the system or user error.

Figure 3:
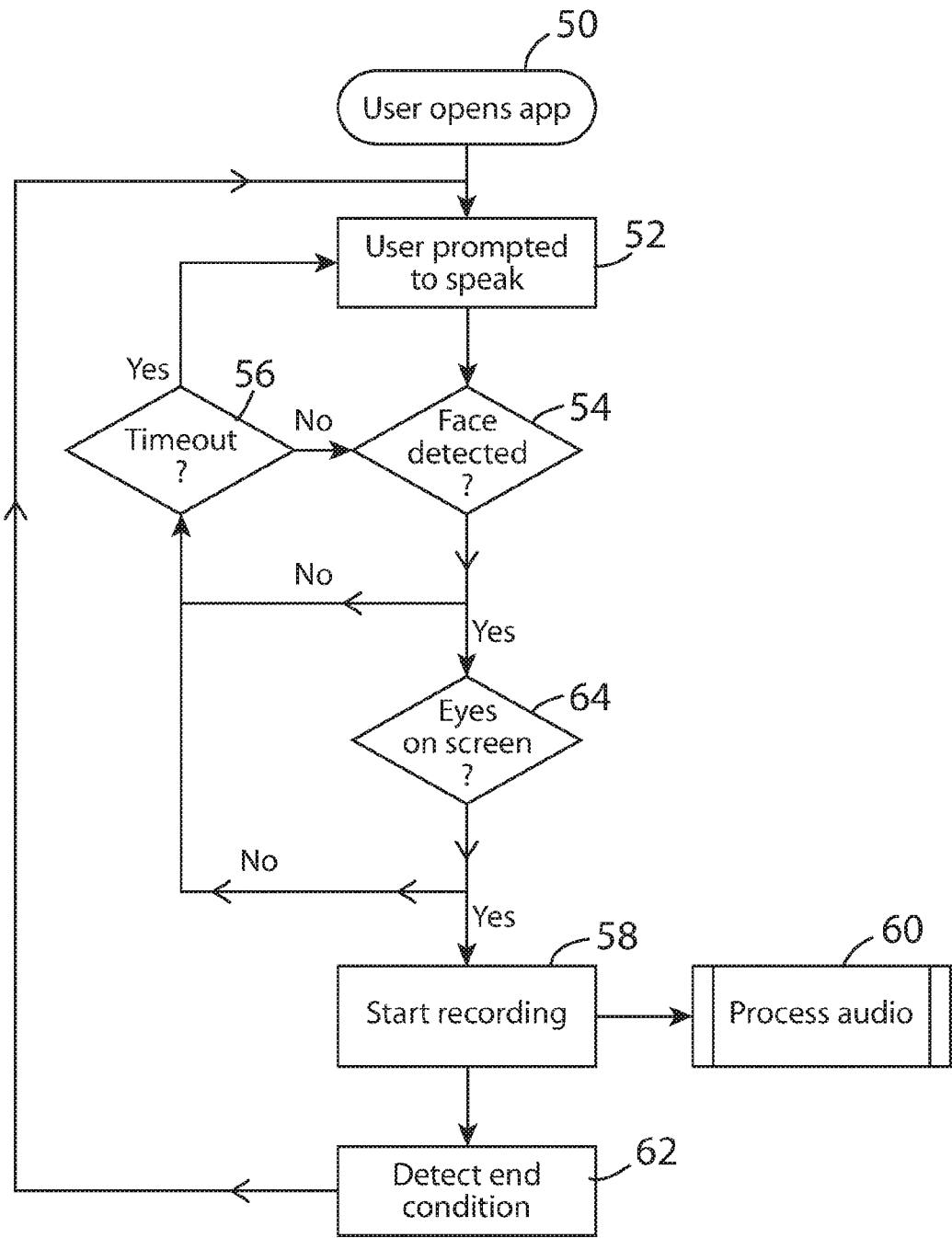
FIG. 3 is a flowchart of a second method of processing user input.

FIG. 3 shows a flowchart of a method that is similar in most respects to that of FIG. 2 but having an additional verification step after a face is detected in step 54. Following a positive determination in step 54, the gaze detection module verifies whether the user's eyes are directed at the screen. It may optionally require that the user's eyes are directed to the part of the screen known to contain the prompt to speak in order to give a positive determination. If the determination is negative, the process reverts to the timeout check 56. If the determination is positive, i.e. both conditions 54 and 64 are met, then recording starts 58 as before.

Figure 4:
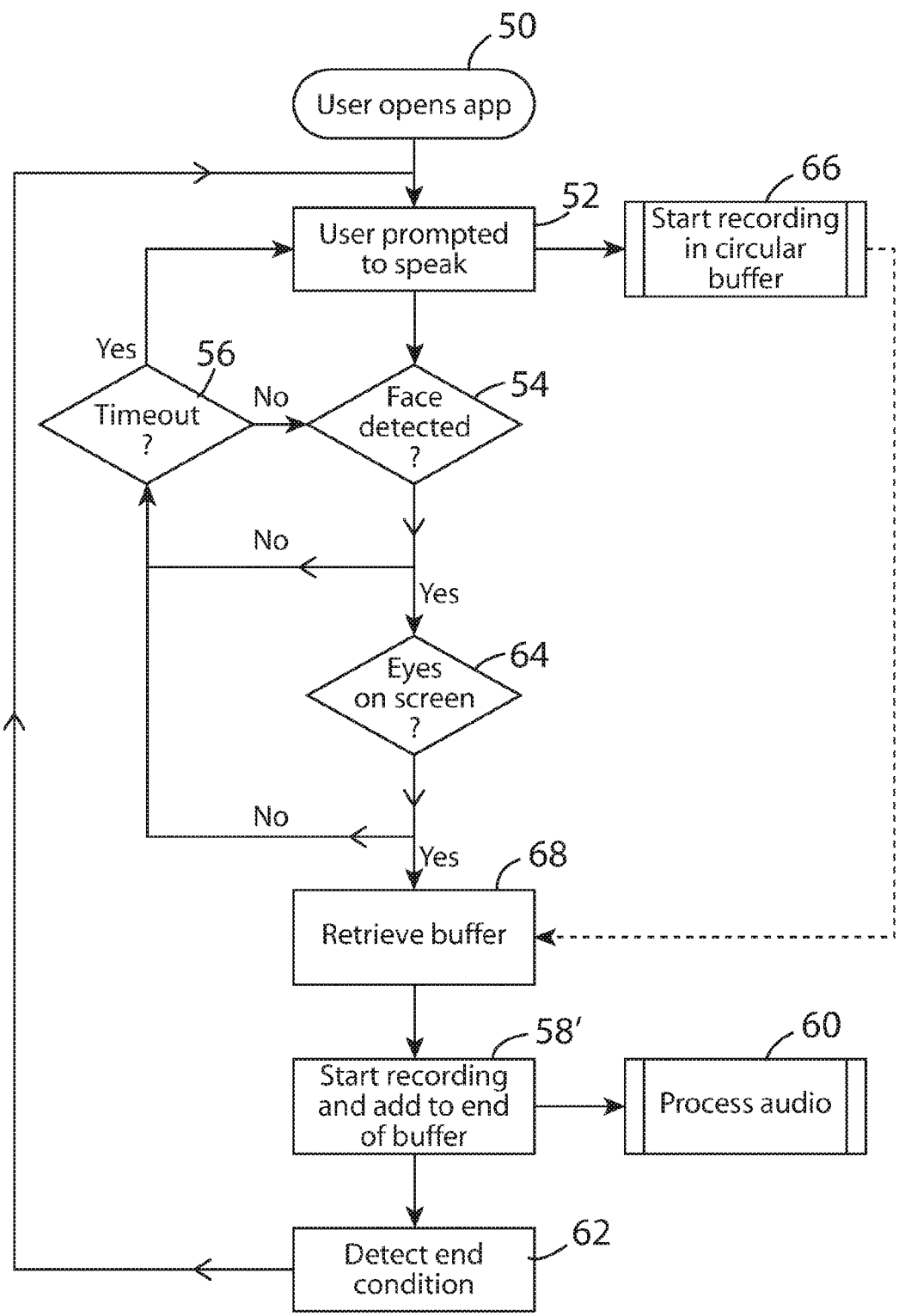
FIG. 4 is a flowchart of a third method of processing user input.

FIG. 4 shows an alternative implementation for the process of FIG. 3. The process of FIG. 4 differs from both FIGS. 2 and 3 in the addition of a buffer. In step 66, after the user is prompted to speak, the system starts to record audio in a circular buffer, step 66. In this way, the system will have a few seconds of past audio continually in the buffer after the prompt occurs. Any delay arising from a delay in face detection 54 or gaze detection 64 can be compensated for, by retrieving the audio from the buffer, step 68, and using the retrieved audio to populate the start of the audio recording and the speech processing. Step 58' is a modification of step 58 of FIGS. 2 and 3. Instead of simply starting recording in real time, an audio recording is populated by the buffer contents and the recording function then adds the real time audio stream on to the end of this file.

The buffer also allows the system to catch up if, for example the user begins to speak just before turning to or looking at the system (e.g. if prompted aurally rather than or in addition to visually).

Figure 5:
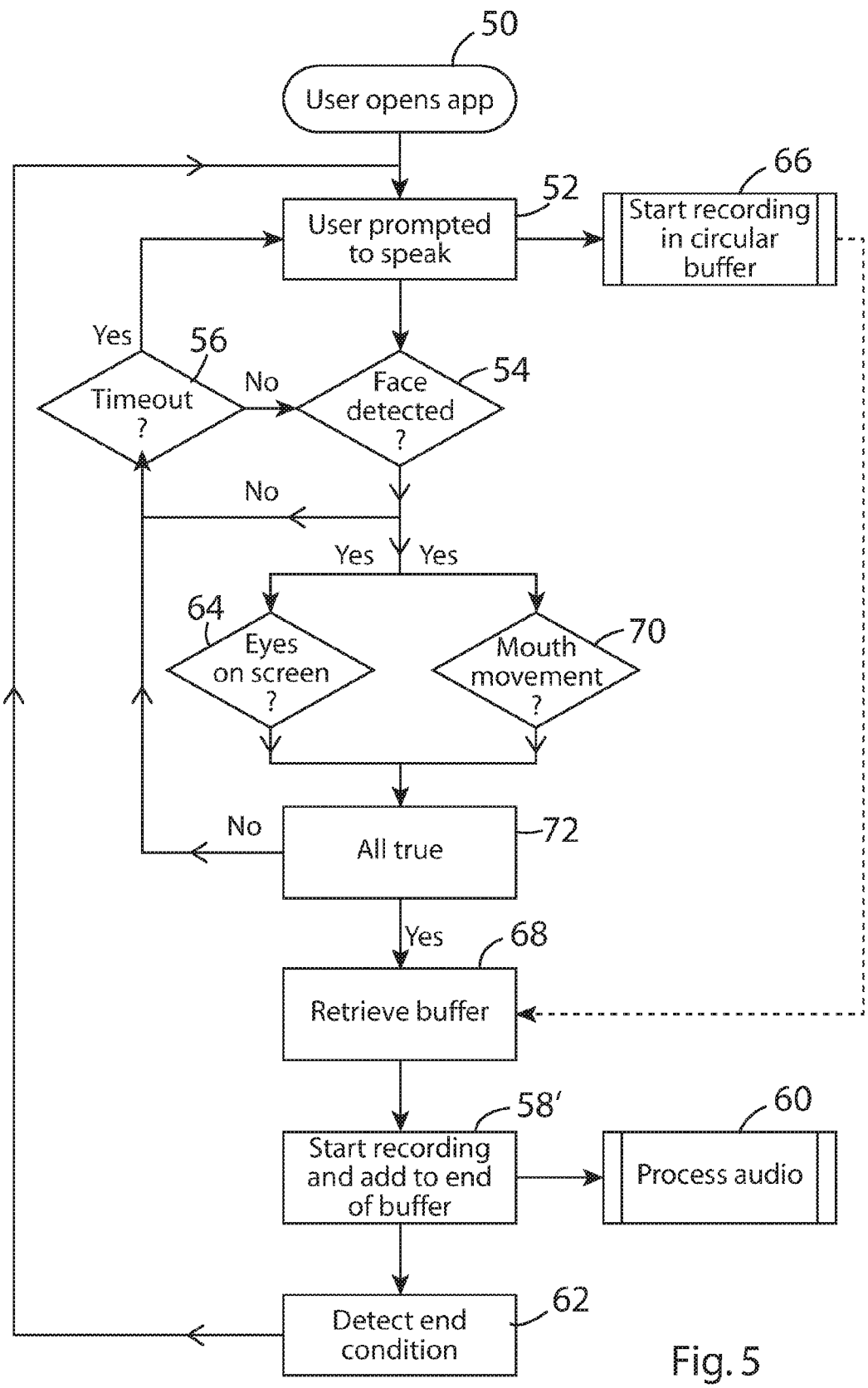
FIG. 5 is a flowchart of a fourth method of processing user input.

FIG. 5 shows a method similar to that of FIG. 4, but with the inclusion of an additional verification condition after face detection step 54 and in parallel with the gaze detection step 64. In step 70, the mouth analysis movement function verifies whether the user's mouth is moving, and optionally whether it is moving in a pattern consistent with speech (or even with the expected words). If the determinations are all positive, step 72, then the process proceeds as before. If not, the system reverts to the timeout check 56. It is possible that a flag is passed back for each of the verification steps, for example to indicate that a face has been detected, and that it has looked at the prompt, but with a negative flag for mouth movement. Then on a subsequent loop, the system will only look for the mouth movement flag to be changed. This is useful to cater for the fact that sometimes a user will be prompted e.g. for a translation or an answer to a question (and will look to the screen for the prompt). Depending on the user, they may look away e.g. look up or close their eyes) while they try to figure out the appropriate response. Therefore at the time of answering, they may no longer be looking at the screen.

Figure 6:
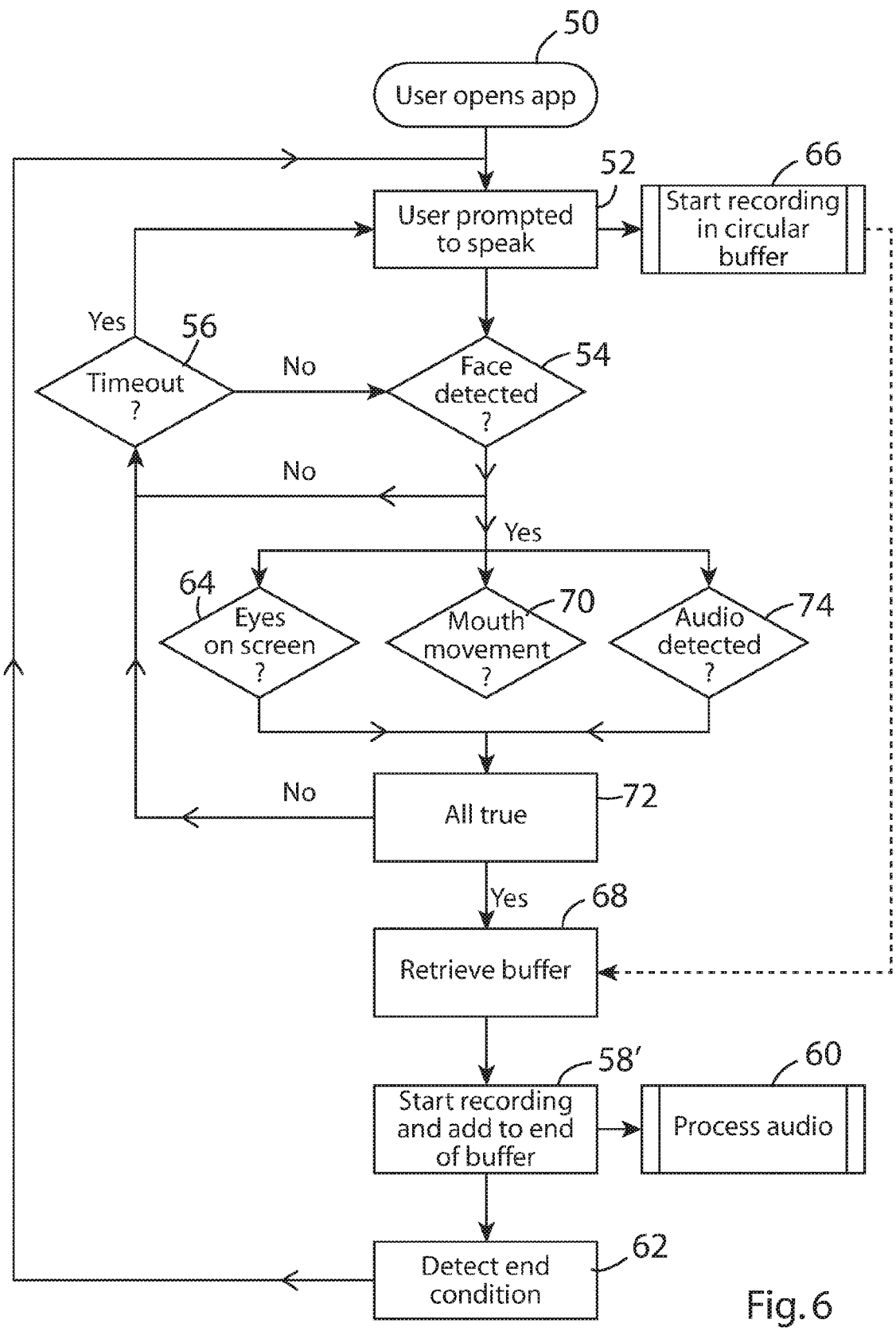
FIG. 6 is a flowchart of a fifth method of processing user input.

FIG. 6 is a modification of FIG. 5, with the addition of a further parallel additional verification step, namely a check whether audio is detected at the microphone, step 74. If all of the determinations, including step 74 are true, the recording begins, similar to FIG. 5.

Figure 7:
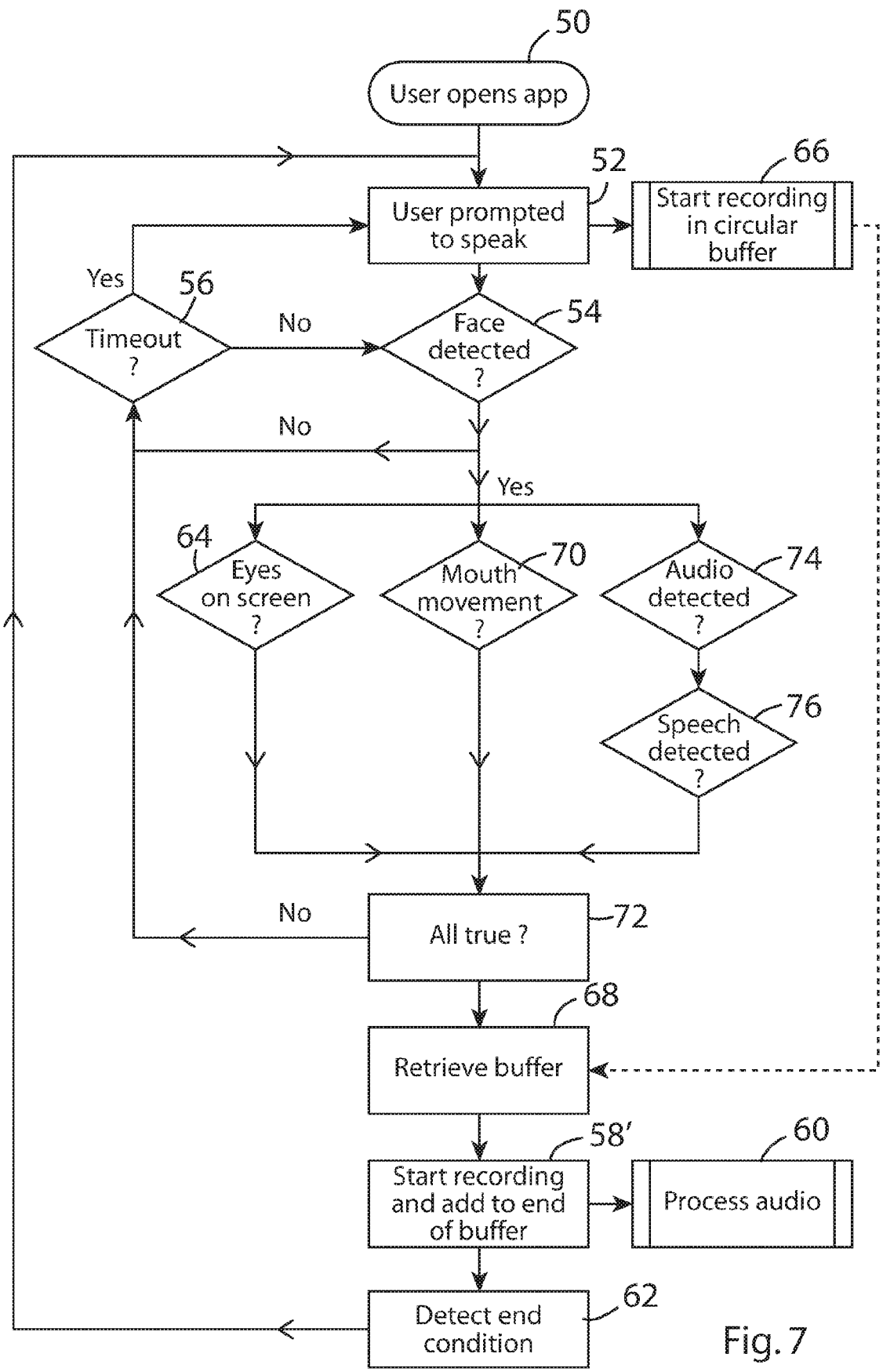
FIG. 7 is a flowchart of a sixth method of processing user input.

FIG. 7 is a modification of FIG. 6, wherein if audio is detected in step 74, it is further processed to determine if it is consistent with speech, step 76. This can eliminate spurious recordings of external noises, coughing, laughter, etc.

While FIGS. 3-7 show that the face detection step occurs prior to any additional verification steps, this need not be the case. The determinations can be in any order, or can be simultaneous or independent of one another. Similarly, while FIGS. 5-7 show a plurality of additional verification steps in parallel to one another, they need not be in parallel and can be in any order or no order with respect to each other and to the face detection step.

The precise combinations of verification steps (face and eyes in FIGS. 3 and 4; face, eyes and mouth in FIG. 5; face, eyes, mouth and audio in FIG. 6; face, eyes, mouth, audio and speech in FIG. 7) are in no way limiting. The combination of face detection with any additional verification step or combination of verification steps, is envisaged. For example, if no gaze detection function is available or there is no mouth movement analysis function available, the system might be programmed to perform face detection and the presence of an audio input of suitable frequency, and use this combination to determine whether to start recording and to make the audio available for processing.

What is claimed is:

1. A method of processing user input to a computing system having an audio input and a visual input, the method comprising:
   receiving, at the computing system, an audio input signal from said audio input;
   performing a determination of whether the user has demonstrated an intent to interact with the computing system via the audio input, wherein determining whether the user has demonstrated the intent to interact with the computing system via the audio input comprises:
     performing a face detection method on an image received from the visual input after the audio input signal has been received; and
     determining whether said face detection method has detected a face after the audio input signal has been received;
   responsive to the determination that the user has demonstrated the intent to interact with the computing system via the audio input, confirming whether the determination that the user has demonstrated the intent to interact with the computing system via the audio input is reliable by (i) performing additional verification operations comprising two or more of matching the face against a user profile of the user, determining whether the face is detected at an expected distance from a camera, or determining whether the face is detected at an expected angle with respect to the camera, and (ii) determining whether a weighted sum of results of the additional verification operations satisfies a threshold; and
   responsive to confirming that the determination that the user has demonstrated the intent to interact with the computing system via the audio input is reliable:
     recording the audio input signal from said audio input; and
     making said audio input signal available to a speech processing function.

2. The method of claim 1, wherein said additional verification operations comprise a gaze direction detection operation to verify that the user is looking in a predefined direction or range of directions.

3. The method of claim 1, wherein said additional verification operations comprise a mouth movement detection operation to verify that the user's mouth is moving.

4. The method of claim 3, wherein said mouth movement detection operation further verifies that the mouth movement of the user corresponds to a movement pattern typical of speech.

5. The method of claim 1, wherein said additional verification operations comprise an audio detection operation to verify that the audio input is receiving sound from the environment of the user.

6. The method of claim 5, wherein said audio detection operation further verifies that the characteristics of detected sound are consistent with speech.

7. The method of claim 5, wherein said audio detection operation further verifies that the direction from which sound is detected is consistent with the direction of the detected face.

8. The method of claim 5, wherein said audio detection operation further verifies that the characteristics of detected sound are consistent with a speech profile stored for a given user.

9. The method of claim 1, wherein said face detection operation verifies that the detected face is oriented in a predetermined direction or range of directions.

10. The method of claim 1, wherein the face detection operation verifies that the visual input is at or below the level of the user's eyes or nose.

11. The method of claim 1, further comprising performing said speech processing function on the recorded signal.

12. The method of claim 1, further comprising sending said recorded audio signal to a remote computing device for speech processing.

13. The method of claim 1, further comprising buffering said audio input signal, and (i) responsive to confirming that the determination that the user has demonstrated the intent to interact with the computing system via the audio input is not reliable, overwriting or discarding the buffered signal; and (ii) responsive to responsive to confirming that the determination that the user has demonstrated the intent to interact with the computing system via the audio input is reliable, retrieving said audio input signal from the buffer.

14. The method of claim 12, wherein said buffer is of sufficient capacity to store an audio input signal of a duration at least as long as the time required to determine the face detection and optionally the additional verification operations.

15. A computing system for processing user input having an audio input and a visual input, the system comprising:
a memory; and
a processor, coupled to the memory, to:
receive, at the computing system, an audio input signal from said audio input;
perform a determination of whether the user has demonstrated an intent to interact with the computing system via the audio input, wherein to determine whether the user has demonstrated the intent to interact with the computing system via the audio input, the processor is further to:
perform a face detection method on an image received from the visual input after the audio input signal has been received; and
determine whether said face detection method has detected a face after the audio input signal has been received;
responsive to the determination that the user has demonstrated the intent to interact with the computing system via the audio input, confirm whether the determination that the user has demonstrated the intent to interact with the computing system via the audio input is reliable by (i) performing additional verification operations comprising two or more of matching the face against a user profile of the user, determining whether the face is detected at an expected distance from a camera, or determining whether the face is detected at an expected angle with respect to the camera, and (ii) determining whether a weighted sum of results of the additional verification operations satisfies a threshold; and
responsive to confirming that the determination that the user has demonstrated the intent to interact with the computing system via the audio input is reliable:
record the audio input signal from said audio input; and
make said audio input signal available to a speech processing function.

16. A non-transitory computer readable medium comprising instructions, which when executed by a processor, cause the processor to perform a method of processing user input to a computing system having an audio input and a visual input, the method comprising:
receiving, at the computing system, an audio input signal from said audio input;
performing a determination of whether the user has demonstrated an intent to interact with the computing system via the audio input, wherein determining whether the user has demonstrated the intent to interact with the computing system via the audio input comprises:
performing a face detection method on an image received from the visual input after the audio input signal has been received; and
determining whether said face detection method has detected a face after the audio input signal has been received;
responsive to the determination that the user has demonstrated the intent to interact with the computing system via the audio input, confirming whether the determination that the user has demonstrated the intent to interact with the computing system via the audio input is reliable by (i) performing additional verification operations comprising two or more of matching the face against a user profile of the user, determining whether the face is detected at an expected distance from a camera, or determining whether the face is detected at an expected angle with respect to the camera, and (ii) determining whether a weighted sum of results of the additional verification operations satisfies a threshold; and
responsive to confirming that the determination that the user has demonstrated the intent to interact with the computing system via the audio input is reliable:
recording the audio input signal from said audio input; and
making said audio input signal available to a speech processing function.

* * * * *